United States Patent
Glasco et al.

(10) Patent No.: US 8,347,064 B1
(45) Date of Patent: Jan. 1, 2013

(54) MEMORY ACCESS TECHNIQUES IN AN APERTURE MAPPED MEMORY SPACE

(75) Inventors: David B. Glasco, Austin, TX (US); John S. Montrym, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 190 days.

(21) Appl. No.: 11/523,926

(22) Filed: Sep. 19, 2006

(51) Int. Cl.
*G06F 12/10* (2006.01)

(52) U.S. Cl. ....................................... 711/206; 711/207

(58) Field of Classification Search ................... 711/203
See application file for complete search history.

(56) References Cited

U.S. PATENT DOCUMENTS

| | | |
|---|---|---|
| 3,815,101 A | 6/1974 | Boss et al. |
| 3,950,729 A | 4/1976 | Fletcher et al. |
| 4,654,790 A | 3/1987 | Woffinden |
| 4,797,814 A | 1/1989 | Brenza |
| 4,812,981 A | 3/1989 | Chan et al. |
| 5,123,094 A | 6/1992 | MacDougall |
| 5,179,669 A | 1/1993 | Peters |
| 5,245,702 A | 9/1993 | McIntyre et al. |
| 5,278,962 A | 1/1994 | Masuda et al. |
| 5,414,824 A | 5/1995 | Grochowski |
| 5,446,854 A | 8/1995 | Khalidi et al. |
| 5,526,504 A | 6/1996 | Hsu et al. |
| 5,649,102 A | 7/1997 | Yamauchi et al. |
| 5,649,184 A | 7/1997 | Hayashi et al. |
| 5,696,925 A | 12/1997 | Koh |
| 5,949,785 A | 9/1999 | Beasley |
| 5,963,984 A | 10/1999 | Garibay, Jr. et al. |
| 5,999,189 A | 12/1999 | Kajiya et al. |
| 6,012,132 A | 1/2000 | Yamada et al. |
| 6,298,390 B1 | 10/2001 | Matena et al. |
| 6,362,826 B1 | 3/2002 | Doyle et al. |
| 6,457,115 B1 | 9/2002 | McGrath |
| 6,470,428 B1 | 10/2002 | Milway et al. |
| 6,499,090 B1 | 12/2002 | Hill et al. |
| 6,549,997 B2 | 4/2003 | Kalyanasundharam |

(Continued)

FOREIGN PATENT DOCUMENTS

JP 02288927 11/1990

(Continued)

OTHER PUBLICATIONS

Harper et al., (Rapid recovery from transient Faults in the fault tolerant processor with fault-tolerant shared memory) 1990, IEEE, p. 350-359.

(Continued)

*Primary Examiner* — Jack A Lane

(57) ABSTRACT

A method of accessing memory, in accordance with one embodiment, includes receiving a memory access request that includes a virtual address. An address of a given page table is determined utilizing a page directory stored in a particular one of a plurality of computing device-readable media. A given one of the plurality of computing device-readable media that stores the given page table is determined from a table aperture attribute in the page directory. A given physical address of a page is determined utilizing the given page table stored in the given computing device-readable media. A corresponding one of the plurality of computing device-readable media that stores the page is determined from a page aperture attribute in the given page table. The corresponding computing device-readable media at the given physical address is then accessed.

14 Claims, 8 Drawing Sheets

U.S. PATENT DOCUMENTS

| | | |
|---|---|---|
| 6,636,223 B1 | 10/2003 | Morein |
| 6,658,538 B2 | 12/2003 | Arimilli et al. |
| 6,742,104 B2 | 5/2004 | Chauvel et al. |
| 6,813,699 B1 | 11/2004 | Belgard |
| 6,823,433 B1 | 11/2004 | Barnes et al. |
| 6,839,813 B2 | 1/2005 | Chauvel |
| 6,859,208 B1 | 2/2005 | White |
| 6,877,077 B2 | 4/2005 | McGee et al. |
| 6,883,079 B1 | 4/2005 | Priborsky |
| 7,007,075 B1 | 2/2006 | Coffey |
| 7,082,508 B2 | 7/2006 | Khan et al. |
| 7,107,441 B2 | 9/2006 | Zimmer et al. |
| 7,120,715 B2 | 10/2006 | Chauvel et al. |
| 7,159,095 B2 | 1/2007 | Dale et al. |
| 7,194,597 B2 | 3/2007 | Willis et al. |
| 7,234,038 B1 | 6/2007 | Durrant |
| 7,275,246 B1 | 9/2007 | Yates, Jr. et al. |
| 7,401,358 B1 | 7/2008 | Christie et al. |
| 7,519,781 B1 | 4/2009 | Wilt |
| 7,545,382 B1 | 6/2009 | Montrym et al. |
| 2002/0004823 A1 | 1/2002 | Anderson et al. |
| 2002/0013889 A1 | 1/2002 | Schuster et al. |
| 2002/0169938 A1 | 11/2002 | Scott et al. |
| 2002/0172199 A1 | 11/2002 | Scott et al. |
| 2003/0014609 A1 | 1/2003 | Kissell |
| 2003/0167420 A1 | 9/2003 | Parsons |
| 2003/0196066 A1 | 10/2003 | Mathews |
| 2003/0236771 A1 | 12/2003 | Becker |
| 2004/0025161 A1 | 2/2004 | Chauvel et al. |
| 2004/0054833 A1 | 3/2004 | Seal et al. |
| 2004/0078778 A1 | 4/2004 | Leymann et al. |
| 2004/0153350 A1 | 8/2004 | Kim et al. |
| 2004/0193831 A1 | 9/2004 | Moyer |
| 2004/0215918 A1 | 10/2004 | Jacobs et al. |
| 2004/0268071 A1 | 12/2004 | Khan et al. |
| 2005/0050013 A1 | 3/2005 | Ferlitsch |
| 2005/0097280 A1 | 5/2005 | Hofstee et al. |
| 2005/0268067 A1 | 12/2005 | Lee et al. |
| 2006/0004984 A1 | 1/2006 | Morris et al. |
| 2006/0069879 A1 | 3/2006 | Inoue et al. |
| 2006/0069899 A1 | 3/2006 | Schoinas et al. |
| 2006/0187945 A1 | 8/2006 | Andersen |
| 2006/0195683 A1 | 8/2006 | Kissell |
| 2006/0230223 A1 | 10/2006 | Kruger et al. |
| 2006/0259732 A1 | 11/2006 | Traut et al. |
| 2006/0259825 A1 | 11/2006 | Cruickshank et al. |
| 2006/0282645 A1 | 12/2006 | Tsien |
| 2006/0288174 A1 | 12/2006 | Nace et al. |
| 2007/0067505 A1 | 3/2007 | Kaniyur et al. |
| 2007/0073996 A1* | 3/2007 | Kruger et al. ............ 711/207 |
| 2007/0106874 A1 | 5/2007 | Pan et al. |
| 2007/0126756 A1 | 6/2007 | Glasco et al. |
| 2007/0157001 A1 | 7/2007 | Ritzau |
| 2007/0168634 A1 | 7/2007 | Morishita et al. |
| 2008/0263284 A1 | 10/2008 | da Silva et al. |

FOREIGN PATENT DOCUMENTS

| | | |
|---|---|---|
| JP | 03054660 | 3/1991 |
| JP | 04182858 | 6/1992 |

OTHER PUBLICATIONS

Ooi, (Fault Tolerant Architecture in a cache memory control LSI), 1992, IEEE, 507-514.
Oracle, (Oracle 8i Parallel server), 1999, Oracle, Release 2 (8.1.6) 1-216.
PCMAG (Definition of: Page fault) PCMag, 1.
Shalan. (Dynamic Memory Management for embedded real-time multiprocessor system on a chip), 2000, ACM. 180-186.
Shalan. (Dynamic Memory Management for embedded real-time multiprocessor system on a chip), 2003, Georgia Inst. Of Tech. 1-118.
Wikipedia, (Page Fault definition) Wikipedia, 1-4.
Osronline, (The Basics: So what is a page fault?) May 2003, p. 1-2.
Non-Final Office Action, Mailed Apr. 27, 2009; U.S. Appl. No. 11/591,685.
Final Office Action, Mailed Nov. 20, 2009; U.S. Appl. No. 11/591,685.
Non-Final Office Action, Mailed May 11, 2010; U.S. Appl. No. 11/591,685.
Election/Restrictions, Mailed Apr. 28, 2009; U.S. Appl. No. 11/592,076.
Non-Final Office Action, Mailed Aug. 19, 2009; U.S. Appl. No. 11/592,076.
Notice of Allowance, Mailed Jan. 29, 2010; U.S. Appl. No. 11/592,076.
Non-Final Office Action, Mailed Sep. 15, 2008; U.S. Appl. No. 11/523,830.
Non-Final Office Action, Mailed May 28, 2009; U.S. Appl. No. 11/523,830.
Final Office Action, Mailed Mar. 16, 2010; U.S. Appl. No. 11/523,830.
Notice of Allowance, Mailed Jun. 28, 2010; U.S. Appl. No. 11/523,830.
Notice of Allowance, Mailed Sep. 2, 2010; U.S. Appl. No. 11/523,830.
Notice of Allowance, Mailed Jan. 20, 2011; U.S. Appl. No. 11/523,830.
Non-Final Office Action, Mailed Nov. 18, 2008; U.S. Appl. No. 11/586,756.
Final Office Action, Mailed Jun. 4, 2009; U.S. Appl. No. 11/586,756.
Non-Final Office Action, Mailed Jan. 20, 2010; U.S. Appl. No. 11/586,756.
Final Office Action, Mailed Aug. 1, 2010; U.S. Appl. No. 11/586,756.
Notice of Allowance, Mailed Dec. 27, 2010; U.S. Appl. No. 11/586,756.
Non-Final Office Action, Mailed Apr. 27, 2009; U.S. Appl. No. 11/591,587.
Non-Final Office Action, Mailed Aug. 19, 2009; U.S. Appl. No. 11/591,587.
Non-Final Office Action, Mailed Dec. 7, 2010; U.S. Appl. No. 11/591,587.
Non-Final Office Action, Mailed Apr. 1, 2009; U.S. Appl. No. 11/592,106.
Final Office Action, Mailed Nov. 23, 2009; U.S. Appl. No. 11/592,106.
Final Office Action, Mailed Jun. 25, 2010; U.S. Appl. No. 11/592,106.
Non-Final Office Action, Mailed Dec. 16, 2010; U.S. Appl. No. 11/592,106.
Non-Final Office Action, Mailed Oct. 29, 2008; U.S. Appl. No. 11/523,950.
Notice of Allowance, Mailed Apr. 24, 2009; U.S. Appl. No. 11/523,950.
Notice of Allowance, Mailed Sep. 3, 2009; U.S. Appl. No. 11/523,950.
Notice of Allowance, Mailed Dec. 24, 2009; U.S. Appl. No. 11/523,950.
Notice of Allowance, Mailed Jul. 21, 2010; U.S. Appl. No. 11/523,950.
Notice of Allowance, Mailed Nov. 3, 2010; U.S. Appl. No. 11/523,950.
Non-Final Office Action, Mailed Dec. 16, 2008; U.S. Appl. No. 11/586,826.
Notice of Allowance, Mailed Jun. 22, 2009; U.S. Appl. No. 11/586,826.
Notice of Allowance, Mailed Dec. 14, 2009; U.S. Appl. No. 11/586,826.
Non-Final Office Action, Mailed Feb. 17, 2009; U.S. Appl. No. 11/592,819.
Notice of Allowance, Mailed Oct. 16, 2009; U.S. Appl. No. 11/592,819.
Non-Final Office Action, Mailed Mar. 17, 2010; U.S. Appl. No. 11/592,819.
Notice of Allowance, Mailed Nov. 23, 2010; U.S. Appl. No. 11/592,819.
Non-Final Office Action, Mailed Feb. 20, 2009; U.S. Appl. No. 11/591,629.
Final Office Action, Mailed Nov. 9, 2009; U.S. Appl. No. 11/591,629.
Non-Final Office Action, Mailed May 27, 2010; U.S. Appl. No. 11/591,629.

Non-Final Office Action, Mailed Nov. 3, 2010 U.S. Appl. No. 11/591,629.
Non-Final Office Action, Mailed Apr. 2, 2009; U.S. Appl. No. 11/592,780.
Final Office Action, Mailed Nov. 24, 2009; U.S. Appl. No. 11/592,780.
Non-Final Office Action, Mailed Apr. 28, 2010; U.S. Appl. No. 11/592,780.
Non-Final Office Action, Mailed Oct. 13, 2010; U.S. Appl. No. 11/592,780.
Non-Final Office Action, Mailed Nov. 13, 2008; U.S. Appl. No. 11/588,177.
Final Office Action, Mailed May 21, 2009; U.S. Appl. No. 11/588,177.
Non-Final Office Action, Mailed Sep. 24, 2009; U.S. Appl. No. 11/588,177.
Final Office Action, Mailed Apr. 27, 2010; U.S. Appl. No. 11/588,177.
Non-Final Office Action, Mailed May 11, 2009; U.S. Appl. No. 11/591,856.
Final Office Action, Mailed Dec. 8, 2009; U.S. Appl. No. 11/591,856.
Non-Final Office Action, Mailed Apr. 27, 2010; U.S. Appl. No. 11/591,856
Notice of Allowance, Mailed Nov. 12, 2010; U.S. Appl. No. 11/591,856.
Non-Final Office Action, Mailed Mar. 18, 2009; U.S. Appl. No. 11/586,825.
Final Office Action, Mailed Oct. 14, 2009; U.S. Appl. No. 11/586,825.
Non-Final Office Action, Mailed Feb. 22, 2010; U.S. Appl. No. 11/586,825.
Notice of Allowance, Mailed Aug. 16, 2010; U.S. Appl. No. 11/586,825.
Notice of Allowance, Mailed Nov. 26, 2010; U.S. Appl. No. 11/586,825.
Laibinis, "Formal Development of Reactive Fault Tolerant Systems", Sep. 9, 2005, Springer, Second International Workshop, RISE 2005, p. 234-249.
Wikipedia, Memory Address, Oct. 29, 2010, pp. 1-4, www.wikipedia.com.
Wikipedia, Physical Address, Apr. 17, 2010, pp. 1-2, www.wikipedia.com.
Final Office Action, Mail Date Oct. 27, 2010, U.S. Appl. No. 11/591,685.
Restriction Dated Aug. 10, 2010; U.S. Appl. No. 12/650,068.
Notice of Allowance; Mail Date May 4, 2010; U.S. Appl. No. 11/592,076.
Notice of Allowance; Mail Date Aug. 13, 2010; U.S. Appl. No. 11/592,076.
Notice of Allowance Dated Nov. 26, 2010; U.S. Appl. No. 11/586,825.
Restriction Requirement; Mail Date Apr. 28, 2009; U.S. Appl. No. 11/592,076.
Final Office Action Dated Aug. 1, 2010; U.S. Appl. No. 11/586,756.
Notice of Allowance Dated Dec. 27, 2010; U.S. Appl. No. 11/586,756.
Restriction Dated Apr. 27, 2009; U.S. Appl. No. 11/591,857.
Office Action Dated Dec. 7, 2009; U.S. Appl. No. 11/591,857.
Final Office Action Dated Jun. 25, 2010; U.S. Appl. No. 11/592,106.
Office Action Dated Dec. 16, 2010; U.S. Appl. No. 11/592,106.
Notice of Allowance Dated Jul. 21, 2010; U.S. Appl. No. 11/523,950.
Notice of Allowance Dated Nov. 3, 2010; U.S. Appl. No. 11/523,950.
Notice of Allowance Dated Dec. 14, 2009; U.S. Appl. No. 11/586,950.
Non-Final Office Action; Mail Date: May 6, 2011; U.S. Appl. No. 11/591,685.
Notice of Allowance; Mail Date: Mar. 17, 2011; U.S. Appl. No. 11/592,076.
Notice of Allowance; Mail Date: Jun. 29, 2011; U.S. Appl. No. 11/592,076.
Final Office Action; Mail Date: Feb. 1, 2011; U.S. Appl. No. 12/650,068.
Non-Final Office Action; Mail Date: Aug. 9, 2011; U.S. Appl. No. 12/650,068.
Notice of Allowance; Mail Date: Jul. 21, 2011; U.S. Appl. No. 11/523,830.
Notice of Allowance; Mail Date: Aug. 25, 2011; U.S. Appl. No. 11/523,926.
Final Office Action; Mail Date: May 4, 2010; U.S. Appl. No. 11/591,857.
Notice of Allowance; Mail Date: Jul. 21, 2011; U.S. Appl. No. 11/591,857.
Final Office Action; Mail Date: Jul. 5, 2011; U.S. Appl. No. 11/592,106.
Notice of Allowance; Mail Date: Jun. 9, 2011; U.S. Appl. No. 11/523,950.
Notice of Allowance; Mail Date: Aug. 30, 2011; U.S. Appl. No. 11/523,950.
Notice of Allowance; Mail Date: Feb. 16, 2011; U.S. Appl. No. 11/586,926.
Notice of Allowance; Mail Date: Jul. 26, 2011; U.S. Appl. No. 11/586,926.
Notice of Allowance; Mail Date: Apr. 19, 2011; U.S. Appl. No. 11/592,819.
Notice of Allowance; Mail Date: Sep. 7, 2011; U.S. Appl. No. 11/592,819.
Final Office Action; Mail Date: Apr. 12, 2011; U.S. Appl. No. 11/592,780.
Non-Final Office Action; Mail Date: Jun. 7, 2011; U.S. Appl. No. 11/588,177.
Notice of Allowance; Mail Date: Jun. 17, 2011; U.S. Appl. No. 11/591,856.
Notice of Allowance; Mail Date: Jun. 16, 2011; U.S. Appl. No. 11/586,825.
Notice of Allowance; Mail Date: Aug. 9, 2011; U.S. Appl. No. 11/586,825.
Final Office Action, Mailed Nov. 16, 2011; U.S. Appl. No. 11/591,685.
Notice of Allowance, Mailed Oct. 14, 2011; U.S. Appl. No. 11/592,076.
Non-Final Office Action, Mailed Nov. 16, 2011; U.S. Appl. No. 12/650,068.
Notice of Allowance, Mailed Jan. 13, 2012; U.S. Appl. No. 11/586,756.
Notice of Allowance, Mailed Oct. 28, 2011; U.S. Appl. No. 11/591,857.
Final Office Action, Mailed Dec. 2, 2011; U.S. Appl. No. 11/592,106.
Notice of Allowance, Mailed Oct. 26, 2011; U.S. Appl. No. 11/523,830.
Notice of Allowance, Mailed Dec. 27, 2011; U.S. Appl. No. 11/586,826.
Notice of Allowance, Mailed Dec. 9, 2011; U.S. Appl. No. 11/592,819.
Non-Final Office Action, Mailed Nov. 1, 2011; U.S. Appl. No. 11/592,780.
Final Office Action, Mailed Nov. 29, 2011; U.S. Appl. No. 11/588,177.
Notice of Allowance, Mailed Dec. 8, 2011; U.S. Appl. No. 11/586,825.
Notice of Allowance, Mailed Feb. 22, 2012; U.S. Appl. No. 11/591,685.
Notice of Allowance, Mailed Jan. 27, 2012; U.S. Appl. No. 11/592,076.
Notice of Allowance, Mailed Feb. 2, 2012; U.S. Appl. No. 11/523,830.
Notice of Allowance, Mailed Feb. 10, 2012; U.S. Appl. No. 11/591,857.
Notice of Allowance, Mailed Nov. 14, 2011; U.S. Appl. No. 11/523,950.
Notice of Allowance, Mailed Sep. 26, 2011; U.S. Appl. No. 11/591,856.
Notice of Allowance, Mailed Jan. 5, 2012; U.S. Appl. No. 11/591,856.
Notice of Allowance, Mailed Mar. 21, 2012; U.S. Appl. No. 11/586,825.

Guelfi et al., (Rapid Integration of Software Engineering Techniques) 2005, Second International Workshop, 9 pages.
Notice of Allowance Dated Feb. 22, 2012; U.S. Appl. No. 11/591,685.
Notice of Allowance Dated May 30, 2012; U.S. Appl. No. 11/591,685.
Notice of Allowance Dated Jan. 27, 2012; U.S. Appl. No. 11/592,076.
Notice of Allowance Dated May 10, 2012; U.S. Appl. No. 11/592,076.
Notice of Allowance Dated May 1, 2012; U.S. Appl. No. 12/650,068.
Notice of Allowance Dated Jul. 6, 2012; U.S. Appl. No. 12/650,068.
Notice of Allowance Dated Feb. 2, 2012; U.S. Appl. No. 11/523,830.
Notice of Allowance Dated May 10, 2012; U.S. Appl. No. 11/523,830.
Notice of Allowance Dated May 15, 2012; U.S. Appl. No. 11/586,756.
Notice of Allowance Dated Feb. 10, 2012; U.S. Appl. No. 11/591,857.
Notice of Allowance Dated May 25, 2012; U.S. Appl. No. 11/591,857.
Final Office Action Dated May 10, 2012; U.S. Appl. No. 11/592,106.
Notice of Allowance Dated Nov. 14, 2011; U.S. Appl. No. 11/523,950.
Notice of Allowance Dated Jul. 5, 2012; U.S. Appl. No. 11/586,826.
Notice of Allowance Dated Jun. 7, 2012; U.S. Appl. No. 11/592,819.
Final Office Action Dated May 7, 2012; U.S. Appl. No. 11/592,780.
Notice of Allowance Dated Sep. 26, 2011; U.S. Appl. No. 11/591,856.
Notice of Allowance Dated Jan. 5, 2012; U.S. Appl. No. 11/591,856.
Notice of Allowance Dated Apr. 12, 2012; U.S. Appl. No. 11/591,856.
Notice of Allowance Dated Jun. 7, 2012; U.S. Appl. No. 11/591,856.
Notice of Allowance Dated Mar. 21, 2012; U.S. Appl. No. 11/586,825.
Notice of Allowance Dated Jul. 6, 2012; U.S. Appl. No. 11/586,825.
Notice of Allowance Dated Sep. 26, 2012; U.S. Appl. No. 11/591,685.
Notice of Allowance Dated Sep. 17, 2012; U.S. Appl. No. 12/650,068.
Notice of Allowance Dated Aug. 16, 2012; U.S. Appl. No. 11/523,830.
Notice of Allowance Dated Sep. 18, 2012; U.S. Appl. No. 11/591,857.
Notice of Allowance Dated Sep. 12, 2012; U.S. Appl. No. 11/523,830.
Notice of Allowance Dated Aug. 29, 2012; U.S. Appl. No. 11/592,819.
Office Action Dated Sep. 14, 2012; U.S. Appl. No. 11/591,629.
Notice of Allowance Dated Sep. 14, 2012; U.S. Appl. No. 11/588,177.
Notice of Allowance Dated Sep. 17, 2012; U.S. Appl. No. 11/591,856.
Notice of Allowance Dated Oct. 12, 2012; U.S. Appl. No. 11/586,825.

* cited by examiner

MEMORY ACCESS TECHNIQUES IN AN APERTURE MAPPED MEMORY SPACE

BACKGROUND OF THE INVENTION

Instructions and data used by a computing device are stored at physical addresses in one or more primary or secondary memory devices. Primary memory devices, such as system memory, graphics memory and the like, is characterized by quick access times but stores a limited amount of data. Secondary memory devices, such as magnetic disk drives, optical disk drives and the like, can store large amounts of data, but have relatively longer access times as compared to the primary memory devices.

Generally, instructions and data are stored in pages in the one or more secondary memory devices. As pages are needed by a given client (e.g., a particular process of an application being performed by a particular engine), they can be moved into one or more primary memory devices. Pages that are no longer needed by the client can be moved from the primary memory device back to the secondary memory device to make room for other pages that are needed by a given application. When pages are moved from secondary to primary memory or moved from primary memory back to secondary memory, their physical addresses change. However, it is undesirable and inefficient for applications running on a computing device to keep track of these changing physical addresses.

Accordingly, the applications utilize virtual addressing to access instructions and data. Virtual addressing provides a separation between the physical memory and the virtual addresses that an application utilized to load or store data and instructions. Processes running inside a virtual memory space do not have to move data between physical memory devices, and do not have to allocate or reallocate portions of the fixed amount of system level memory between them. Instead, a memory management unit (MMU) and/or the operating system (OS) keeps track of the physical location of each piece of data, and moves data between physical locations to improve performance and/or ensure reliability.

Referring to FIG. 1, an exemplary address translation data structure utilized to translate virtual addresses 110 to physical addresses 120 is illustrated. The address translation data structure may include a page table data structure 130 and a translation lookaside buffer (TLB) 140. The page table data structure 130 may include a page directory 150 and one or more page tables 160-190. The page directory 150 includes a plurality of page directory entries (PDE). Each PDE includes the address of a corresponding page table 160-190. Each PDE may also include one or more parameters. Each page table 160-190 includes one or more page table entries (PTE). Each PTE includes a corresponding physical address of data and/or instructions in primary or secondary memory. Each PTE may also include one or more parameters.

Upon receiving a virtual address, the TLB 140 is accessed to determine if a mapping between the virtual address 110 and the physical address 120 has been cached. If a valid mapping has been cached (e.g., TLB hit), the physical address 120 is output from the TLB 140. If a valid mapping is not cached in the TLB 140, the page table data structure is walked to translate the virtual address 110 to a physical address 120. More specifically, the virtual address 110 may include a page directory index, a page table index, and a byte index. The page directory index in the virtual address 110 is used to index the page directory 150 to obtain the address of an appropriate page table 170. The page table index in the virtual address 110 is used to index the appropriate page table specified in the given PDE to obtain the physical address 120 of the page containing the data. The byte index in the virtual address 110 is then used to index the physical page to access the actual data. The resulting mapping is then typically cached in the TLB 140 for use in translating subsequent memory access requests. Furthermore, as a page moves from secondary memory to primary memory or from primary memory back to secondary memory, the corresponding PTE in the page table data structure 130 and TLB 140 is updated.

SUMMARY OF THE INVENTION

Embodiments of the present invention are directed toward memory access techniques for aperture mapped memory spaces. In one embodiment, a computing device includes a memory management unit communicatively coupled to a plurality of computing device-readable media. One or more of the computing device-readable media contain an address translation data structure. The memory management unit is adapted to translate an address in a virtual memory space into an address in a physical memory space of a given one of the plurality of computing device-readable media as specified by an aperture parameter in the address translation data structure.

In another embodiment, a method of accessing memory includes receiving a memory access request. The virtual address of the memory access request is translated into a physical address utilizing an address translation data structure. A corresponding one of a plurality of computing device-readable media, that the physical address pertains to, is determine from a corresponding aperture attribute in the address translation data structure. The corresponding computing device-readable media at the physical address is then accessed in accordance with the memory access request.

In yet another embodiment, a method of accessing memory includes receiving a virtual address. An address of a given page table is determined utilizing a page directory stored in a particular one of a plurality of computing device-readable media. A given one of the plurality of computing device-readable media that stores the given page table is determined from a table aperture attribute in the page directory. A given physical address of a page is determined utilizing the given page table stored in the given computing device-readable media. A corresponding one of the plurality of computing device-readable media that stores the page is determined from a page aperture attribute in the given page table. The corresponding computing device-readable media at the given physical address is then accessed.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
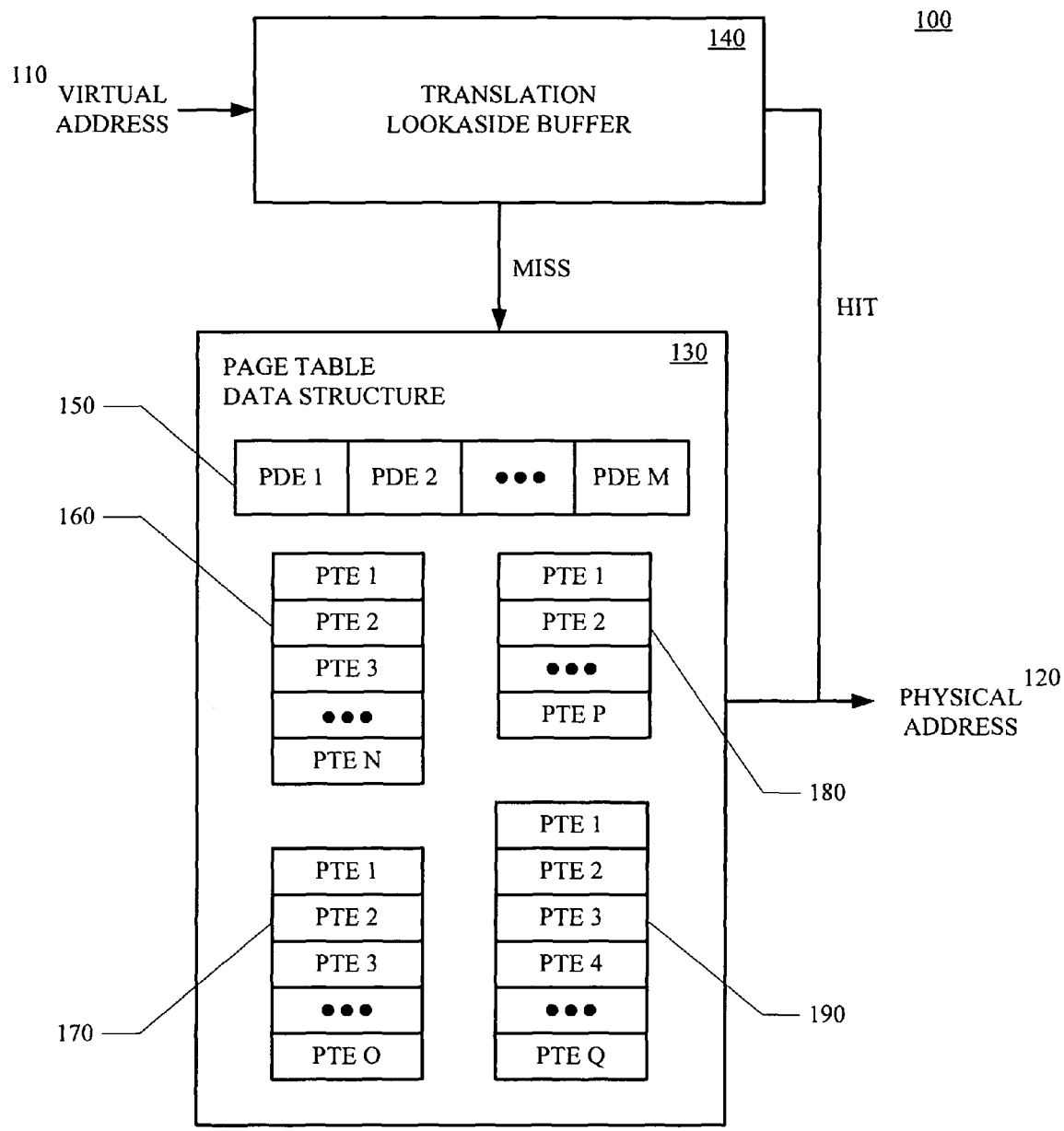
FIG. 1 shows a block diagram of an exemplary address translation data structure according to the conventional art.
Figure 2:
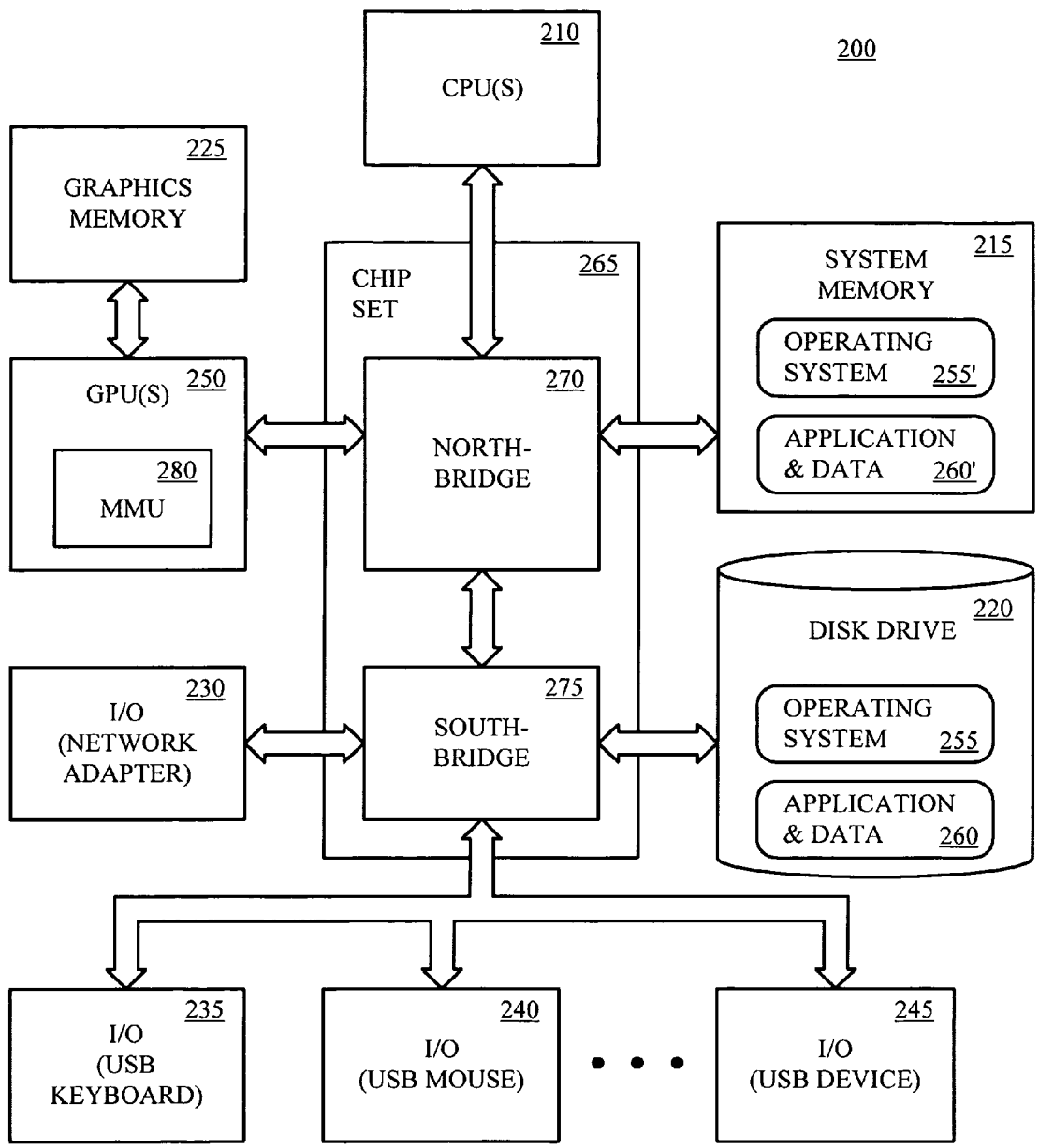
FIG. 2 shows a block diagram of an exemplary computing device for implementing embodiments of the present invention.

Referring to FIG. 2, an exemplary computing device 200 for implementing embodiments of the present invention is shown. The computing device 200 may be a personal computer, server computer, client computer, laptop computer, hand-held device, minicomputer, mainframe computer, distributed computer system or the like. The computing device 200 includes one or more processors (e.g., CPU) 210, one or more computing device-readable media 215, 220, 225 and one or more input/output (I/O) devices 220, 230, 235, 240, 245. The I/O devices 230, 235, 240, 245 may include a network adapter (e.g., Ethernet card), CD drive, DVD drive and/or the like, and peripherals such as a keyboard, a pointing device, a speaker, a printer, and/or the like. One or more I/O devices, such as a network adapter 230, may provide for communicating with one or more other peer computing devices. The computing device 200 may also include one or more specialized processors, such as a graphics processing unit (GPU) 250. If the computing device 200 includes a plurality of GPUs 250, it may also include a plurality of graphics memories 225.

The computing device-readable media 215, 220, 225 may be characterized as primary memory and secondary memory. Generally, the secondary memory, such as a magnetic and/or optical storage, provides for non-volatile storage of computer-readable instructions and data for use by the computing device 200. For instance, the disk drive 220 may store the operating system (OS) 255 and applications and data 260. The primary memory, such as the system memory 215 and/or graphics memory 225, provides for volatile storage of computer-readable instructions and data for use by the computing device 200. For instance, the system memory 215 may temporarily store a portion of the operating system 255' and a portion of one or more applications and associated data 260' that are currently used by the CPU 210, GPU 250 and the like.

The computing device-readable media 215, 220, 225, I/O devices 220, 230, 235, 240, 245, and GPU(s) 250 may be communicatively coupled to the processor 210 by a chip set 265 and one or more busses. The chipset 265 acts as a simple input/output hub for communicating data and instructions between the processor 210 and the computing device-readable media 215, 220, 225, I/O devices 220, 230, 235, 240, 245, and GPU 250. In one implementation, the chipset 265 includes a northbridge 270 and southbridge 275. The northbridge 270 provides for communication with the processor 210 and interaction with the system memory 215. The southbridge 275 provides for input/output functions.

The graphics processing unit 250 may include a memory management unit (MMU) 280 for managing the transfer of data and instructions. However, in other embodiments the MMU 280 may be independent circuit, a part of the chip set 265, a part of the primary or secondary memory, or other component in the computing device.

The MMU 280 translates virtual address to physical addresses. In one implementation, the virtual address space is divided into pages of size 2N bytes. The pages may be from 2 kilobytes to 512 megabytes or more, and are typically 4 kilobytes to 64 kilobytes in size. In such cases, the MMU 280 translates virtual page numbers to physical page numbers utilizing an address translation data structure.

The MMU 280 and/or OS 255 also implements page allocation. In particular, if no memory location is free it may be necessary to choose an existing page, using any well-known in the art replacement algorithm, and save it to non-system memory (e.g., a mass storage device such as a disk). The MMU 280 and/or OS 255 controls swapping pages between primary and secondary memory and updating the associated mappings in the address translation data structure.

Figure 3:
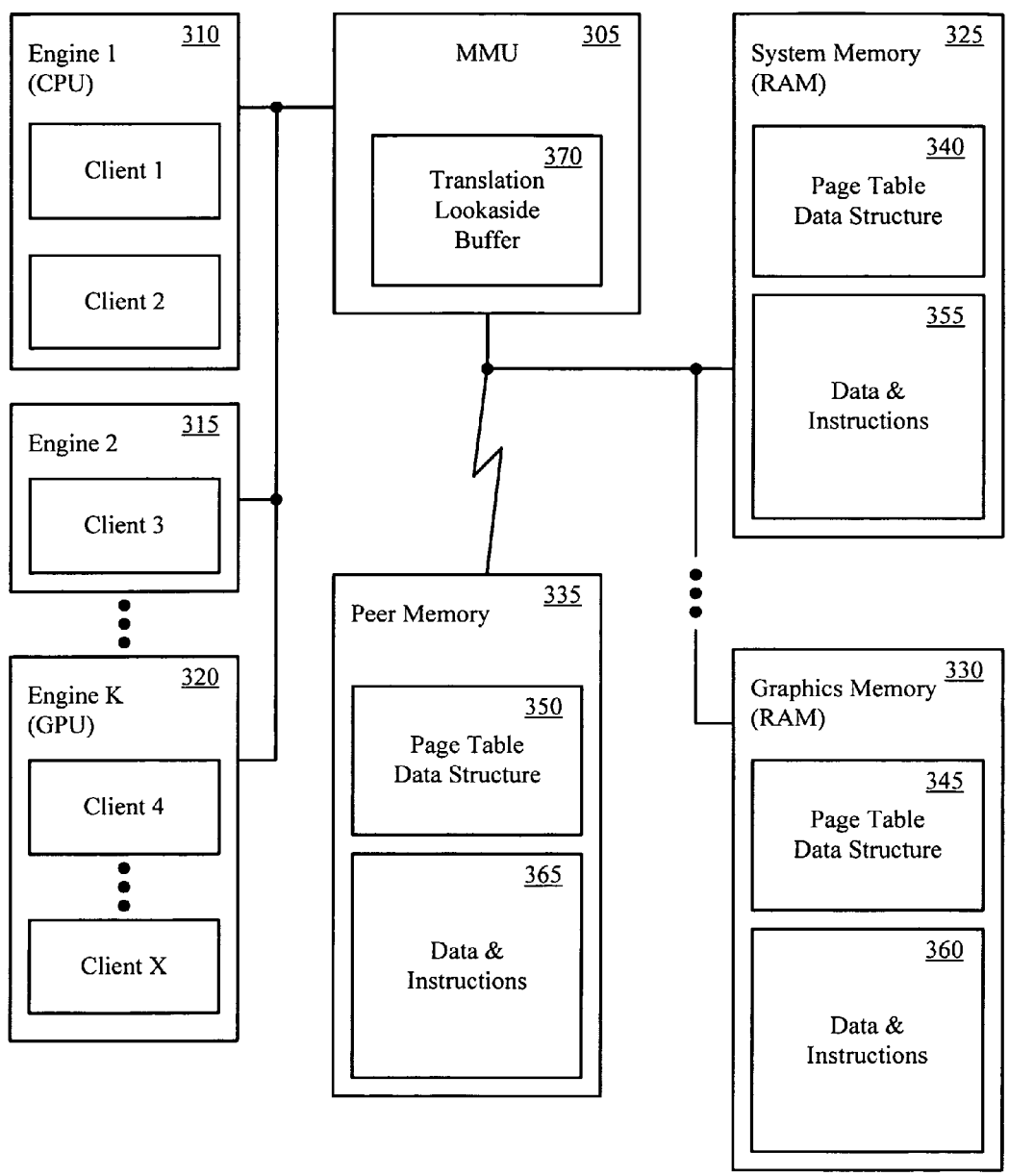
FIG. 3 shows a block diagram of a memory access system, in accordance with one embodiment of the present invention.

Referring now to FIG. 3, a memory access system 300, in accordance with one embodiment of the present invention, is shown. The memory access system 300 includes a memory management unit (MMU) 305 coupled between one or more engines 310, 315, 320 and a plurality of computing device-readable media (e.g., memory devices), such as system memory 325, graphics memory 330, peer memory 335, and the like.

One or more of the computing device-readable media 325, 330, 335 may store one or more address translation data structures 340, 345, 350, and data and instructions 355, 360, 365. The address translation data structures 340, 345, 350 are adapted to translate the virtual address contained in a memory access request to a physical address in a given one of a plurality of memory devices 325, 330, 335. A portion of one or more of the address translation data structures 340, 345, 350 may be cached in the MMU 305. For example, in one implementation, a given address translation data structure 345 may include one or more page table data structures stored in a given memory 330 and one or more TLBs 370 cached in the MMU 305.

Figure 4:
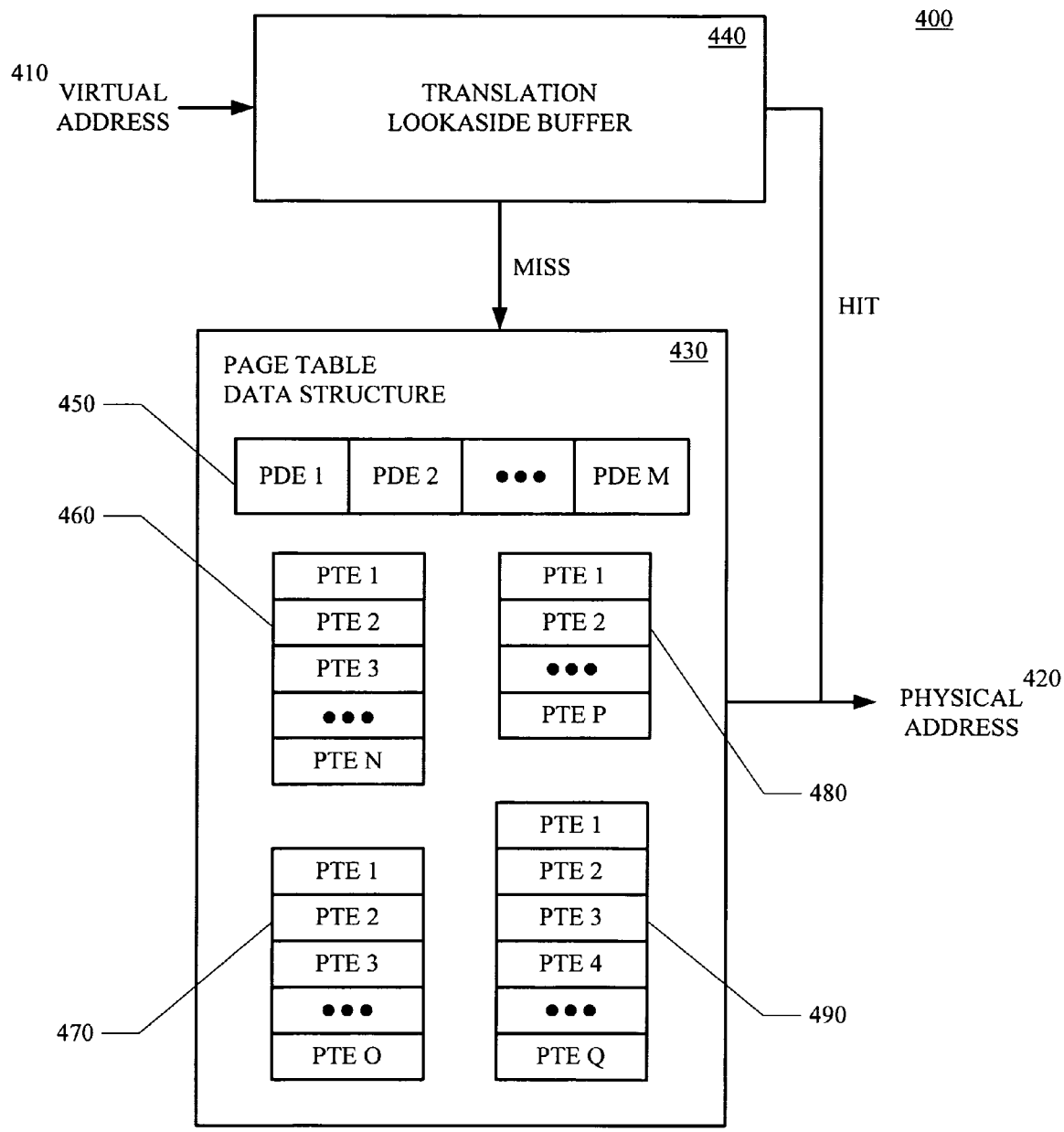
FIG. 4 shows a block diagram of an address translation data structure, in accordance with one embodiment of the present invention.

Referring now to FIG. 4, an address translation data structure 400 utilized to convert virtual addresses to physical addresses, in accordance with one embodiment of the present invention, is shown. The address translation data structure 400 may include a page table data structure 430 and a translation lookaside buffer 440. The page table data structure 430 may be a two-level data structure including a page directory 440 and one or more page tables 460-490. However, the page table data structure 430 may be arranged in any number of levels.

Figure 5:
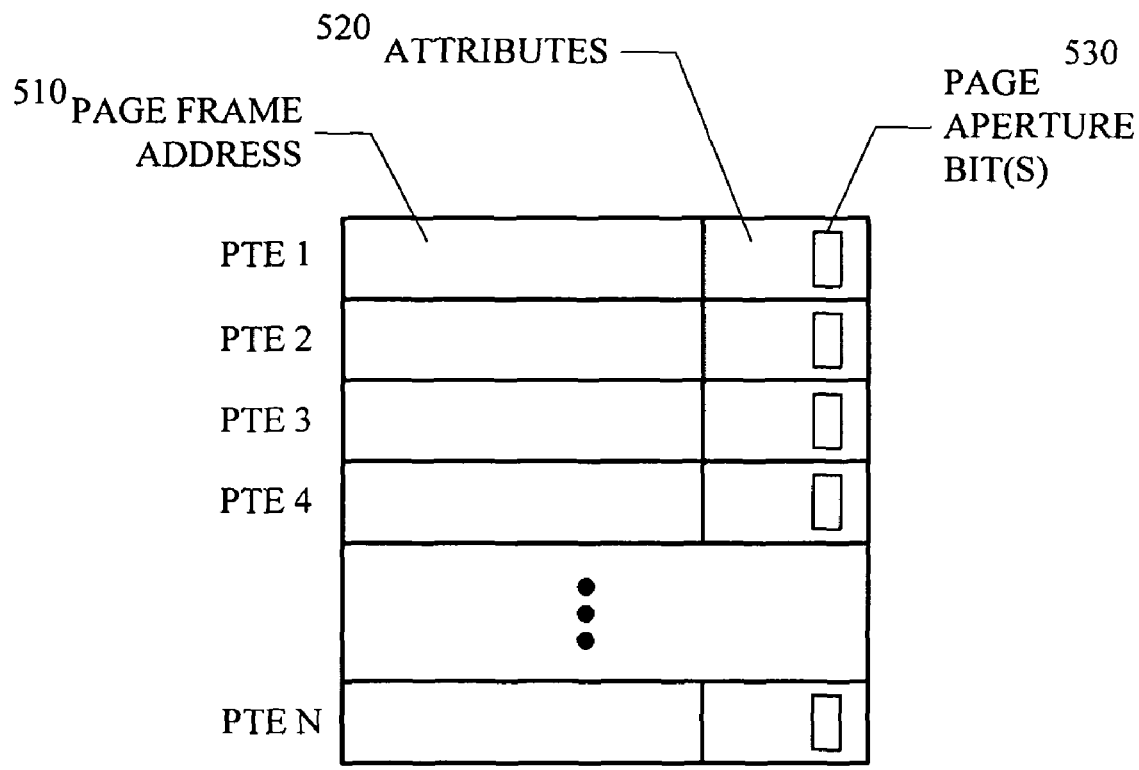
FIG. 5 shows a block diagram of an exemplary page table, in accordance with one embodiment of the present invention.

Each page directory 450 includes a plurality of page directory entries (PDE). Each PDE includes the address of a corresponding page table 460-490. Each PDE may also include one or more attributes for use in performing the address translation and accessing the physical memory. Each page table 440-460 includes one or more page table entries (PTE). An exemplary page table, in accordance with one embodiment of the present invention, is illustrated in FIG. 5. Each PTE in the page table 500 includes a page frame address 510 and one or more attributes 520. The attributes 520 may include one or more page aperture bits 530, a dirty bit, an accessed bit, a page check disable bit, page write transparent bit, a user accessible bit, a writeable bit, a present bit, a hash function identification bit, a valid bit, an address compare bit, a referenced bit, a changed bit, storage control bits, a no execute bit, page protection bits and/or the like.

Upon receiving a virtual address 410, the address translation data structure 400 is accessed to translate the virtual address 410 to a physical address 420 utilizing a given PTE store in the page table data structure 430 or cached in the TLB 440. A page aperture attribute in the given PTE is also accessed to determine a given one of a plurality of memory devices that the physical address corresponds to.

In particular, upon receiving a virtual address 410, the TLB 440 is accessed to determine if a mapping between the virtual address 410 and the physical address 420 has been cached. If a valid mapping has been cached (e.g., TLB hit), the physical address 420 is output from the TLB 440. The page aperture attribute in the matching TLB entry identifies the given one of a plurality of memory devices that the physical address corresponds to. If a valid mapping is not cached in the TLB, the page table data structure 430 is walked to translate the virtual address 410 to a physical address 420. More specifically, the virtual address 410 may include a page directory index, a page table index, and a byte index. The page directory index in the virtual address 410 is used to index the page directory 450 to obtain the address of an appropriate page table 470. The page table index in the virtual address 410 is used to index the appropriate page table specified in the given PDE to obtain the physical address 420 of the page containing the data as specified in the indexed PTE. In addition, the page aperture attribute in the indexed PTE specifies a given one of a plurality of memory devices that stores the page at the physical address 420. The byte index in the virtual address 410 is then used to index the physical page in the given memory device to access the actual data. The resulting mapping is then typically cached in the TLB 440 for use in translating subsequent memory access requests. Furthermore, as a page moves from secondary memory to primary memory or from primary memory back to secondary memory, the corresponding PTE in the page table data structure 430 and TLB 440 is updated.

In one implementation, the memory access request may be submitted by an engine of the graphics processing unit 320. In the conventional art the TLB 440 or page table data structure 430 translates the virtual address to a physical address in the memory device local to the engine that submitted the memory access request. Accordingly, the TLB 440 or page table data structure 430 would translate the virtual address 410 received from the engine of the graphics processing unit 320 to a physical address 420 in the graphics memory 330. However, utilizing the aperture bit specified in the given page table entry, the TLB 440 or page table data structure 430 of the present invention can translate the virtual address 410 to a physical address 420 in the local memory device 330 or one of a plurality of other memory devices 325, 335.

Figure 6:
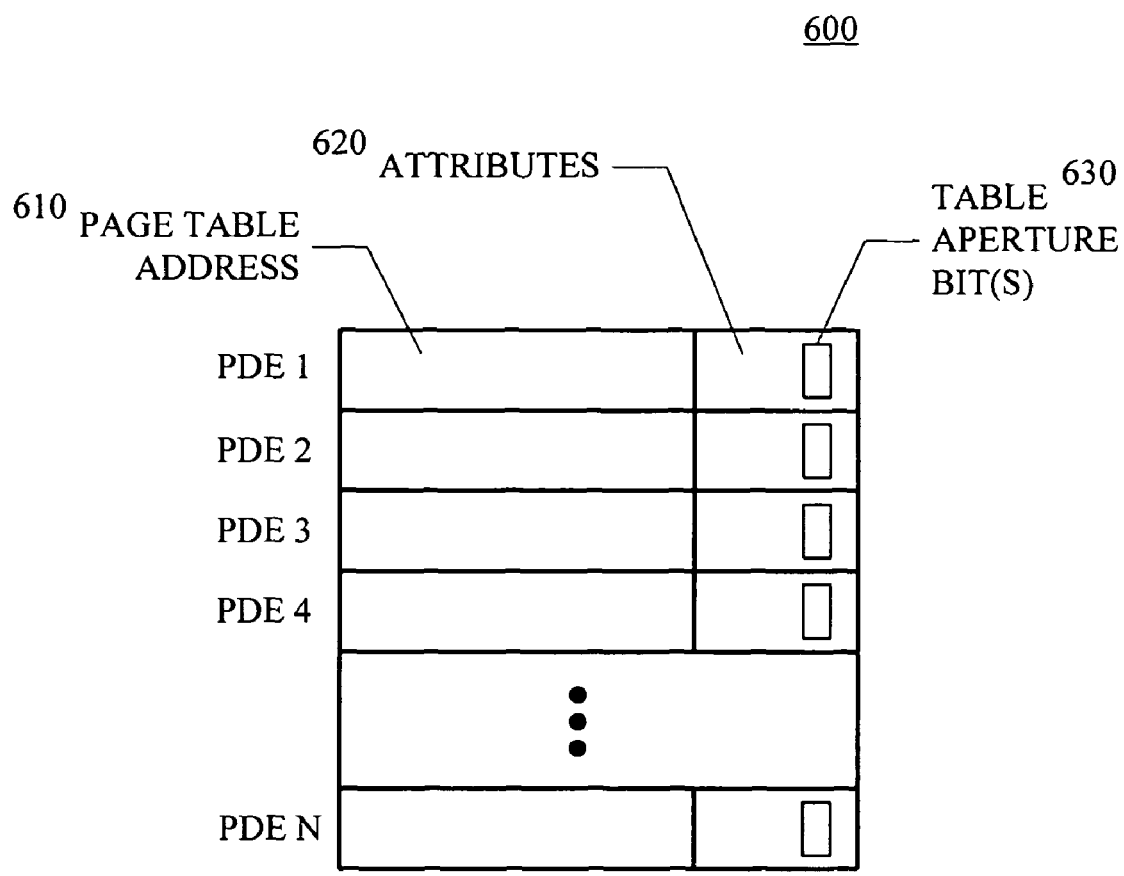
FIG. 6 shows a block diagram of an exemplary page directory, in accordance with one embodiment of the present invention.

Referring now to FIG. 6, an exemplary page directory, in accordance with one embodiment of the present invention, is shown. Each PDE in the page directory 600 includes an address of a page table 610 and one or more attributes 620. The attributes 620 may include one or more page aperture bits 630, a page size bit, an accessed bit, a page check disable bit, page write transparent bit, a user accessible bit, a writeable bit, a present bit, and/or the like. The page aperture bits, in each PDE, specify a memory device that stores a given page table to be utilized to translate the page number in the virtual address to an appropriate physical address 420. Furthermore, the PTE in the applicable page table may include one or more page aperture bits that specify a given one of a plurality of memory devices that stores the page at the physical address 420.

In particular, upon receiving a memory access request, a TLB 440 and/or page table data structure 430 local to the engine making the request is accessed. For example, the page table data structure 430 is accessed to service a memory access request received from a graphics engine 320. The page table number in the virtual address 410 is used to index the page directory 450 to determine a given PDE that includes the address of an appropriate page table and a table aperture attribute. The table aperture attribute specifies a given one of a plurality of memory devices that stores the given page table. For example, the indexed PDE in the TLB stored in the graphics memory may have a table aperture attribute set to indicate that the given page table to be utilized for translating the page number to a physical address may be stored in the system memory 325. The page number in the virtual address 410 is used to index the appropriate page table, in the given memory device specified in the given PDE, to determine a given PTE that includes a given physical address 420 of a page and a page aperture attribute. The page aperture attribute in the given PTE specifies a given one of a plurality of memory devices that stores the page at the physical address. The byte index in the virtual address 410 is then used to index the physical page, in the given memory device specified by the given PTE, to access the data.

In yet another embodiment, the attributes in the PDEs include one or more table aperture bits, but the attributes in the PTEs do not include page aperture bits. Therefore, upon receiving a memory access request, a page table data structure and/or TLB local to the engine making the request is accessed. For example, the page table number in the virtual address 410 is used to index a page directory 430 in the local page table data structure to determine a PDE that includes the address of a given page table and a table aperture attribute. The given page table may be one of the page tables in the page table data structure 430 in the given memory device that stores the page table data structure 430, or in another address translation data structure located in another memory device. Accordingly, the table aperture attribute specifies a given one of a plurality of memory devices that stores the given page table. The page number in the virtual address 410 is used to index the given page table, in the given memory device specified by the page aperture attribute in the given PDE, to determine a given PTE that includes a given physical address 420 of a page in the memory device specified in the given PDE. The byte index in the virtual address 410 is then used to index the physical page to access the data.

Figure 7:
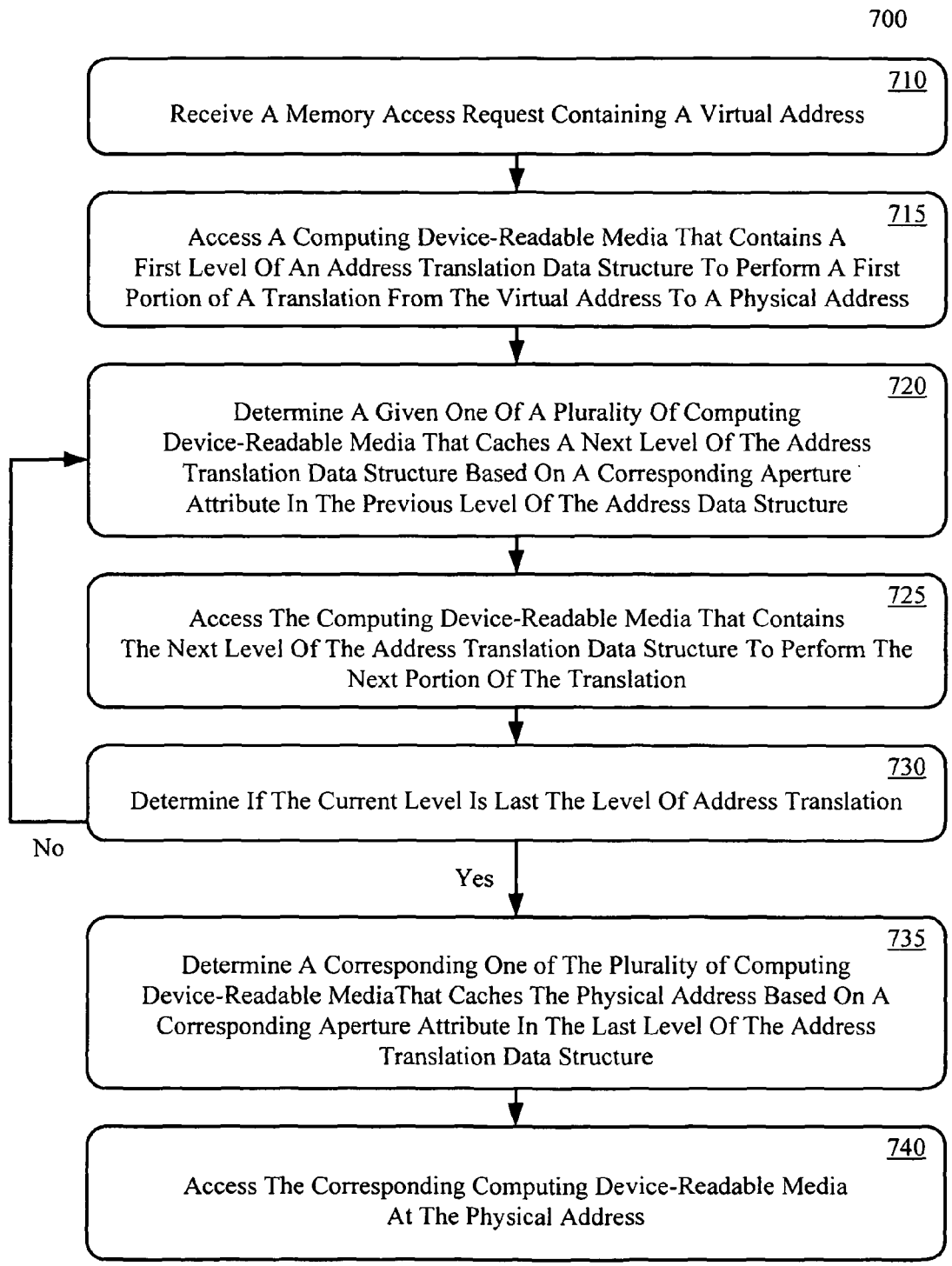
FIG. 7 shows a flow diagram of a method of accessing memory in an aperture mapped memory space, in accordance with one embodiment of the present invention.

Referring now to FIG. 7, a method of accessing memory in an aperture mapped memory space, in accordance with one embodiment of the present invention, is shown. The method includes receiving a memory access request from a given engine, at 710. The virtual address of the memory access request is translated to a physical address utilizing an address translation data structure. The address translation data structure may include a plurality of levels, wherein one or more of the levels may be stored in a different one of a plurality of computing device-readable media. In addition, the data at the physical address may also be stored in one of a plurality of computing device-readable media.

Accordingly, a computing device-readable media, local to the given engine (e.g., a particular computing device-readable media), which contains a first level of an address translation data structure, is accessed to perform a first portion of a translation from the virtual address to a physical address, at 715. At 720, a given one of a plurality of computing device-readable media that stores a next level of the address translation data structure is determined based on a corresponding aperture attribute in the previous level of the address translation data structure. If the previous level of the address translation data structure does not include a corresponding aperture attribute than the next level of the address translation data structure is stored in the computing device-readable media that stores the previous level of the address translation data structure. At 725, the computing device-readable media that contains the next level of the address translation data structure is accessed to perform the next portion of the translation from the virtual address to the physical address. The processes of 720 and 725 are iteratively repeated until the translation of the virtual address to the physical address is completed. More specifically, it is determined if the current level of the address translation data structure is the last level, at 730. If the current level is not the last level of the address translation data structure the processes of 720 and 725 are repeated.

Thereafter, a corresponding one of the plurality of computing device-readable media that stores the physical page is determined based on a corresponding aperture attribute in the last level of the address translation data structure, at 735. If the last level does not include a corresponding aperture attribute, then the corresponding computing device-readable media that stores the physical page is the same as the computing device-readable media that stores the last level of the address translation data structure At 740, the corresponding one of the plurality of computing device-readable media that stores the physical address is accessed to perform the memory access request. For example, data received from a client may be stored in the given computing device-readable media at the location within the physical page number specified by the byte index contained in the virtual address in response to a write request. In response to a read request, data stored at the byte index within the physical page number of the given computing device-readable media can be retrieved for the client.

Figure 8:
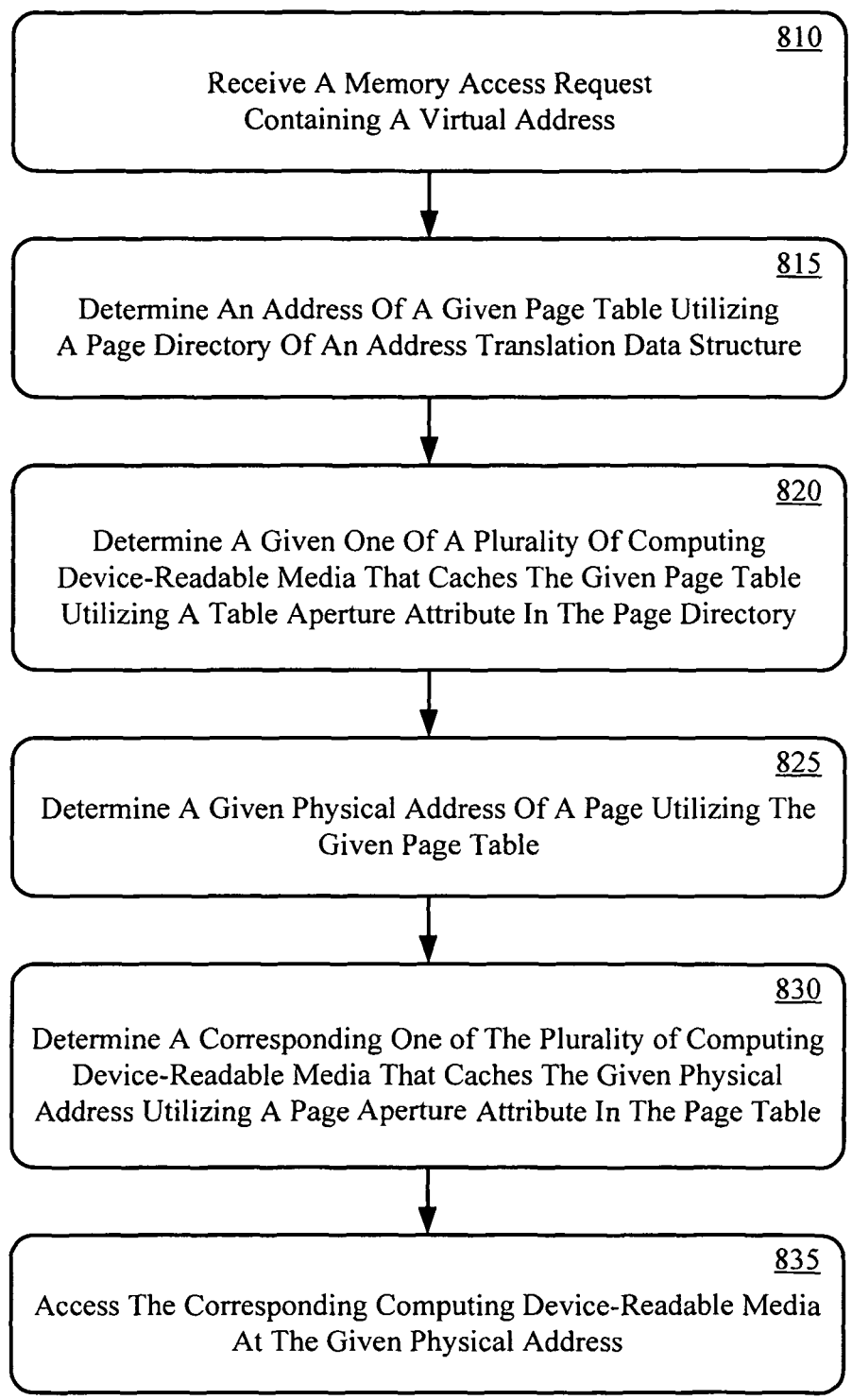
FIG. 8 shows a flow diagram of a method of accessing memory in an aperture mapped memory space, in accordance with another embodiment of the present invention.

Referring now to FIG. 8, a method of accessing memory in an aperture mapped memory space, in accordance with another embodiment of the present invention, is shown. The method includes receiving a memory access request from a given engine, at 810. The memory access request contains a virtual address that includes a page table number, a page number and a byte index. At 815, an address of a given page table is determined utilizing a page directory of a page table data structure. In particular, the page directory is indexed utilizing the page table number in the virtual address to determine an address of a given page table. The given PDE indexed by the page table number includes the address of a given page table.

At 820, a given one of a plurality of computing device-readable media that stores the given page table may be determined utilizing a table aperture attribute contained in the given PDE. The table aperture attribute in the given PDE specifies the given computing device-readable media that the address of the given page table pertains to. Accordingly, the address of the given page table may be a page table stored locally with the page directory or may be stored in another memory device.

At 825, a given physical address of a page is determined utilizing the given page table. In particular, the page number of the virtual address is utilized to index the given page table located at the address specified in the given PDE in the given computing device-readable media specified by the table aperture attribute also contained in the given PDE. The given PTE indexed by the page number includes a physical address that points to the start of a given page. Accordingly, the given physical address is determined by combining the byte index contained with the virtual address with the physical address contained in the given PTE.

At 830, a corresponding one of the plurality of computing device-readable media that stores the given physical address is determined utilizing a page aperture attribute contained in the given PTE. The page aperture attribute in the given PTE specifies the corresponding computing device-readable media that the given physical address pertains to. Accordingly, the given physical address may pertain to a page stored locally with the page table or may be stored in another memory device.

At 835, the corresponding computing device-readable media is accessed at the given physical address. For example, data received from a client may be stored in the corresponding computing device-readable media at the physical address within the physical page number specified by the byte index contained in the virtual address in response to a write request. In response to a read request, data stored at the byte index from the physical address within the corresponding computing device-readable media can be retrieved for the client.

In another embodiment, the page directory entries may not include a table aperture attribute. If the given PDE does not include a table aperture attribute, the processes at 815 may be skipped and the address of the given page table specified in the indexed PDE refers to a page table stored locally with the page directory.

In yet another embodiment, the page table entries may not include a page aperture attribute. If the given PTE does not include a page aperture attribute, the address of the given physical page specified in the indexed PTE refers to a page stored locally with the page table.

The above described memory access techniques that include aperture mapping of address spaces advantageously allow the OS and/or MMU that manage address translation to optimize placement of data and/or portions of the address translation data structure utilized to access the data. For example, if a large texture is to be used by a graphics application, the pages that are frequently accessed can be placed in graphics memory and the remaining pages of the texture can be placed in system memory. As usage of the texture changes, pages can be moved around between the physical address spaces provided by the graphics and system memory.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:
1. A computing device comprising:
 a plurality of computing device-readable media, wherein at least two levels of an address translation data structure are stored on different computing device-readable media; and a memory management unit, communicatively coupled to the plurality of computing device-readable media, adapted to translate an address in a virtual memory space into an address in a physical memory space utilizing the address translation data structure, wherein a given one of the plurality of computing device-readable media that contains a next level of the address translation data structure is determined based on a corresponding aperture attribute in a previous level of the address translation data structure.

2. The computing device of claim 1, wherein:
the first level of the address translation data structure comprises a page directory; and
the second level of the address translation data structure comprises a page table.

3. The computing device of claim 2, wherein the page table comprises a plurality of page table entries, wherein each page table entry includes a page frame address and a page aperture attribute that specifies a corresponding one of the plurality of computing device-readable media that corresponds to the physical address specified in the page frame address.

4. A method of accessing memory comprising:
receiving a memory access request having a virtual address;
accessing a particular computing device-readable media that contains a first level of an address translation data structure to perform a first portion of a translation from the virtual address to a physical address;
determining a given one of the plurality of computing device-readable media that contains a next level of the address translation data structure based on a corresponding aperture attribute in a previous level of the address translation data structure;
accessing a given computing device-readable media that contains the next level of the address translation data structure to perform the next portion of the translation, wherein the next level of the address translation data structure is stored in the computing device-readable media that stores the previous level of the address translation data structure if the previously level of the address translation data structure does not include a corresponding aperture attribute;
determining a corresponding one of a plurality of computing device-readable media that stores the physical address from a corresponding aperture attribute in a last level of the address translation data structure; and
accessing the corresponding computing device-readable media at the physical address, wherein the corresponding computing device-readable media that stores the physical page is the same as the computing device-readable media that stores the last level of the address translation data structure if the previous level of the address translation data structure does not include a corresponding aperture attribute.

5. The method according to claim 4, wherein accessing the computing device-readable media that contains the first level of the address translation data structure to perform a first portion of a translation from the virtual address to the physical address comprises indexing a directory table of the address translation data structure utilizing a page table number of the virtual address to determine a given page directory entry that includes a page table address.

6. The method according to claim 5, further comprising accessing the computing device-readable media that contains the first level of the address translation data structure to determine the corresponding aperture attribute.

7. The method according to claim 6, wherein accessing the computing device-readable media that contains the first level of the address translation data structure to determine the corresponding aperture attribute comprises indexing the directory table of the address translation data structure utilizing the page table number of the virtual address to determine the given page directory entry that includes the corresponding aperture attribute.

8. The method according to claim 4, wherein the particular computing device-readable media and the given computing device-readable media are the same computing device-readable media, and is different from the corresponding computing device-readable media.

9. The method according to claim 4, wherein the given computing device-readable media and the corresponding computing device-readable media are the same computing device-readable media, and is different from the particular computing device-readable media.

10. A method of accessing memory comprising:
receiving a virtual address;
determining an address of a given page table utilizing a page directory stored in a particular one of a plurality of computing device-readable media for the received virtual address;
determining a given one of the plurality of computing device-readable media that stores the given page table from a table aperture attribute in the page directory for the received virtual address;
determining a given physical address of a page utilizing the given page table stored in the given computing device-readable media for the received virtual address;
determining a corresponding one of the plurality of computing device-readable media that stores the page from a page aperture attribute in the given page table; and
accessing the corresponding computing device-readable media at the given physical address.

11. The method according to claim 10, wherein determining the address of the page table comprises:
indexing the page directory utilizing a page table number specified in the virtual address to determine an appropriate page directory entry; and
accessing the appropriate page directory entry to determine the address of the given page table.

12. The method according to claim 10, wherein determining the given one of the plurality of computing device-readable media that stores the given page table comprises:
indexing the page directory utilizing a page table number specified in the virtual address to determine an appropriate page directory entry; and
accessing the appropriate page directory entry to determine a table aperture attribute that specifies the given one of the plurality of computing device-readable media.

13. The method according to claim 10, wherein determining the given physical address of the page comprises:
indexing the page table utilizing a page number specified in the virtual address to determine an appropriate page table entry; and
accessing the appropriate page table entry to determine the given physical address of the page.

14. The method according to claim 13, wherein determining the corresponding one of the plurality of computing device-readable media that stores the page comprises:
indexing the page table utilizing the page number specified in the virtual address to determine an appropriate page table entry; and accessing the appropriate page table entry to determine a table aperture attribute that specifies the corresponding one of the plurality of computing device-readable media.

* * * * *